United States Patent
Lu

(10) Patent No.: US 7,600,826 B2
(45) Date of Patent: Oct. 13, 2009

(54) SYSTEM FOR DYNAMICALLY DETERMINING AXLE LOADINGS OF A MOVING VEHICLE USING INTEGRATED SENSING SYSTEM AND ITS APPLICATION IN VEHICLE DYNAMICS CONTROLS

(75) Inventor: Jianbo Lu, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 510 days.

(21) Appl. No.: 11/270,365

(22) Filed: Nov. 9, 2005

(65) Prior Publication Data

US 2007/0106442 A1    May 10, 2007

(51) Int. Cl.
*B60T 8/60* (2006.01)
(52) U.S. Cl. .............................. 303/146; 701/38; 701/45
(58) Field of Classification Search ................... 303/13, 303/20, 146, 150, 168; 701/36, 38, 40, 41, 701/42, 45; 340/438, 440, 441, 465
See application file for complete search history.

(56) References Cited

U.S. PATENT DOCUMENTS

| | | | |
|---|---|---|---|
| 2,917,126 A | 12/1959 | Phillips | |
| 3,604,273 A | 9/1971 | Kwok et al. | |
| 3,608,925 A | 9/1971 | Murphy | |
| 3,797,893 A | 3/1974 | Burckhardt | |
| 3,899,028 A | 8/1975 | Morris et al. | |
| 3,948,567 A | 4/1976 | Kasselmann et al. | |
| 3,972,543 A | 8/1976 | Presley et al. | |
| 4,023,864 A | 5/1977 | Lang et al. | |
| RE30,550 E | 3/1981 | Reise | |
| 4,294,113 A | 10/1981 | Sprott et al. | |
| 4,480,714 A | 11/1984 | Yabuta et al. | |
| 4,548,079 A | 10/1985 | Klatt | |
| 4,592,565 A | 6/1986 | Eagle | |
| 4,597,462 A | 7/1986 | Sano et al. | |
| 4,624,476 A | 11/1986 | Tanaka et al. | |
| 4,650,212 A | 3/1987 | Yoshimura | |
| 4,679,808 A | 7/1987 | Ito et al. | |
| 4,690,553 A | 9/1987 | Fukamizu et al. | |
| 4,696,489 A | 9/1987 | Fujishiro et al. | |
| 4,705,130 A | 11/1987 | Fukunaga et al. | |
| 4,712,807 A | 12/1987 | Kurosawa | |
| 4,761,022 A | 8/1988 | Ohashi | |

(Continued)

FOREIGN PATENT DOCUMENTS

DE          36 16 907        11/1987

(Continued)

OTHER PUBLICATIONS

U.S. Appl. No. 10/459,697, filed Jun. 11, 2003, Lu.

(Continued)

*Primary Examiner*—Pam Rodriguez
(74) *Attorney, Agent, or Firm*—Angela M. Brunetti; Fredrick Owens

(57) ABSTRACT

A vehicle (10) includes a control system (18) that is used to control a vehicle system. The control system determines a wheel normal loading in response to heave motion wheel loading, attitude-based wheel loading, and vertical motion induced wheel loading. The various wheel loadings may be indirectly determined from the sensors of the various dynamic control system outputs.

47 Claims, 3 Drawing Sheets

U.S. PATENT DOCUMENTS

| | | | |
|---|---|---|---|
| 4,765,649 A | 8/1988 | Ikemoto et al. |
| 4,767,588 A | 8/1988 | Ito |
| 4,778,773 A | 10/1988 | Sukegawa |
| 4,797,823 A | 1/1989 | Ikemoto et al. |
| 4,809,183 A | 2/1989 | Eckert |
| 4,827,416 A | 5/1989 | Kawagoe et al. |
| 4,846,496 A | 7/1989 | Tanaka et al. |
| 4,872,116 A | 10/1989 | Ito et al. |
| 4,888,696 A | 12/1989 | Akatsu et al. |
| 4,898,431 A | 2/1990 | Karnopp et al. |
| 4,930,082 A | 5/1990 | Harara et al. |
| 4,951,198 A | 8/1990 | Watanabe et al. |
| 4,960,292 A | 10/1990 | Sadler |
| 4,964,679 A | 10/1990 | Rath |
| 4,967,865 A | 11/1990 | Schindler |
| 4,976,330 A | 12/1990 | Matsumoto |
| 4,998,593 A | 3/1991 | Karnopp et al. |
| 5,002,141 A | 3/1991 | Loshbough et al. |
| 5,002,142 A | 3/1991 | Klosterhaus |
| 5,033,770 A | 7/1991 | Kamimura et al. |
| 5,058,017 A | 10/1991 | Adachi et al. |
| 5,066,041 A | 11/1991 | Kindermann et al. |
| 5,085,458 A | 2/1992 | Kii et al. |
| 5,088,040 A | 2/1992 | Matsuda et al. |
| 5,089,967 A | 2/1992 | Haseda et al. |
| 5,097,917 A | 3/1992 | Serizawa et al. |
| 5,159,553 A | 10/1992 | Karnopp et al. |
| 5,163,319 A | 11/1992 | Spies et al. |
| 5,189,920 A | 3/1993 | Martinez |
| 5,200,896 A | 4/1993 | Sato et al. |
| 5,208,749 A | 5/1993 | Adachi et al. |
| 5,217,248 A | 6/1993 | Reast |
| 5,224,765 A | 7/1993 | Matsuda |
| 5,228,757 A | 7/1993 | Ito et al. |
| 5,230,396 A | 7/1993 | Yasui |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,265,481 A | 11/1993 | Sonderegger et al. |
| 5,274,576 A | 12/1993 | Williams |
| 5,278,761 A | 1/1994 | Ander et al. |
| 5,282,134 A | 1/1994 | Gioutsos et al. |
| 5,297,646 A | 3/1994 | Yamamura et al. |
| 5,307,274 A | 4/1994 | Takata et al. |
| 5,311,431 A | 5/1994 | Cao et al. |
| 5,311,956 A | 5/1994 | Sugiyama |
| 5,324,102 A | 6/1994 | Roll et al. |
| 5,335,176 A | 8/1994 | Nakamura |
| 5,365,439 A | 11/1994 | Momose et al. |
| 5,370,199 A | 12/1994 | Akuta et al. |
| 5,408,411 A | 4/1995 | Nakamura et al. |
| 5,438,515 A | 8/1995 | Miichi et al. |
| 5,446,658 A | 8/1995 | Pastor et al. |
| 5,455,770 A | 10/1995 | Hadeler et al. |
| 5,490,063 A | 2/1996 | Genise |
| 5,510,989 A | 4/1996 | Zabler et al. |
| 5,515,277 A | 5/1996 | Mine |
| 5,548,536 A | 8/1996 | Ammon |
| 5,549,328 A | 8/1996 | Cubalchini |
| 5,560,688 A | 10/1996 | Schappler et al. |
| 5,576,957 A | 11/1996 | Asanuma et al. |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,684,702 A | 11/1997 | Phillips et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,719,790 A | 2/1998 | Lohrenz et al. |
| 5,720,533 A | 2/1998 | Pastor et al. |
| 5,722,743 A | 3/1998 | Sano |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,740,877 A | 4/1998 | Sasaki |
| 5,742,918 A | 4/1998 | Ashrafi et al. |
| 5,742,919 A | 4/1998 | Ashrafi et al. |
| 5,762,406 A | 6/1998 | Yasui et al. |
| 5,774,819 A | 6/1998 | Yamamoto et al. |
| 5,782,543 A | 7/1998 | Monzaki et al. |
| 5,787,375 A | 7/1998 | Madau et al. |
| 5,797,663 A | 8/1998 | Kawaguchi et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody et al. |
| 5,842,143 A | 11/1998 | Lohrenz et al. |
| 5,857,160 A | 1/1999 | Dickinson et al. |
| 5,857,535 A | 1/1999 | Brooks |
| 5,869,943 A | 2/1999 | Nakashima et al. |
| 5,878,357 A | 3/1999 | Sivashankar et al. |
| 5,890,084 A | 3/1999 | Halasz et al. |
| 5,893,896 A | 4/1999 | Imamura et al. |
| 5,925,083 A | 7/1999 | Ackermann |
| 5,926,087 A | 7/1999 | Busch |
| 5,931,546 A | 8/1999 | Nakashima et al. |
| 5,931,887 A | 8/1999 | Hac |
| 5,935,181 A | 8/1999 | Iwasaki |
| 5,941,920 A | 8/1999 | Schubert |
| 5,944,137 A | 8/1999 | Moser et al. |
| 5,944,392 A | 8/1999 | Tachihata et al. |
| 5,946,644 A | 8/1999 | Cowan et al. |
| 5,948,028 A | 9/1999 | Raad et al. |
| 5,964,819 A | 10/1999 | Naito |
| 5,965,808 A | 10/1999 | Normann |
| 5,971,503 A | 10/1999 | Joyce et al. |
| 6,002,974 A | 12/1999 | Schiffman |
| 6,002,975 A | 12/1999 | Schiffman et al. |
| 6,026,926 A | 2/2000 | Noro et al. |
| 6,038,495 A | 3/2000 | Schiffman |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A | 5/2000 | Wielenga |
| 6,073,065 A | 6/2000 | Brown et al. |
| 6,079,513 A | 6/2000 | Nishizaki et al. |
| 6,081,761 A | 6/2000 | Harada et al. |
| 6,085,133 A | 7/2000 | Keuper et al. |
| 6,085,860 A | 7/2000 | Hackl et al. |
| 6,086,168 A | 7/2000 | Rump |
| 6,089,344 A | 7/2000 | Baughn et al. |
| 6,104,284 A | 8/2000 | Otsuka |
| 6,121,873 A | 9/2000 | Yamada et al. |
| 6,122,568 A | 9/2000 | Madau et al. |
| 6,122,584 A | 9/2000 | Lin et al. |
| 6,129,172 A | 10/2000 | Yoshida |
| 6,141,604 A | 10/2000 | Mattes et al. |
| 6,141,605 A | 10/2000 | Joyce |
| 6,144,904 A | 11/2000 | Tseng |
| 6,149,251 A | 11/2000 | Wuerth et al. |

| | | | | | | |
|---|---|---|---|---|---|---|
| 6,161,905 | A | 12/2000 | Hac et al. | 6,498,976 | B1 | 12/2002 | Ehlbeck et al. |
| 6,167,357 | A | 12/2000 | Zhu | 6,502,023 | B1 | 12/2002 | Fukada |
| 6,169,939 | B1 | 1/2001 | Raad et al. | 6,523,637 | B1 | 2/2003 | Nakano et al. |
| 6,169,946 | B1 | 1/2001 | Griessbach | 6,526,342 | B1 | 2/2003 | Burdock et al. |
| 6,170,594 | B1 | 1/2001 | Gilbert | 6,529,803 | B2 | 3/2003 | Meyers et al. |
| 6,176,555 | B1 | 1/2001 | Semsey | 6,529,811 | B2 | 3/2003 | Watson et al. |
| 6,178,365 | B1 | 1/2001 | Kawagoe et al. | 6,542,073 | B2 | 4/2003 | Yeh et al. |
| 6,178,375 | B1 | 1/2001 | Breunig | 6,542,792 | B2 | 4/2003 | Schubert et al. |
| 6,179,310 | B1 | 1/2001 | Clare et al. | 6,547,022 | B2 | 4/2003 | Hosomi et al. |
| 6,179,394 | B1 | 1/2001 | Browalski et al. | 6,547,343 | B1 | 4/2003 | Hac |
| 6,184,637 | B1 | 2/2001 | Yamawaki et al. | 6,553,284 | B2 | 4/2003 | Holst et al. |
| 6,185,485 | B1 | 2/2001 | Ashrafti et al. | 6,554,293 | B1 | 4/2003 | Fennel et al. |
| 6,185,497 | B1 | 2/2001 | Taniguchi et al. | 6,556,908 | B1 | 4/2003 | Lu et al. |
| 6,186,267 | B1 | 2/2001 | Hackl et al. | 6,559,634 | B2 | 5/2003 | Yamada |
| 6,192,305 | B1 | 2/2001 | Schiffmann | 6,593,849 | B2 | 7/2003 | Chubb |
| 6,195,606 | B1 | 2/2001 | Barta et al. | 6,598,946 | B2 | 7/2003 | Nagae |
| 6,198,988 | B1 | 3/2001 | Tseng | 6,600,414 | B2 | 7/2003 | Foo et al. |
| 6,202,009 | B1 | 3/2001 | Tseng | 6,600,985 | B2 | 7/2003 | Weaver |
| 6,202,020 | B1 | 3/2001 | Kyrtsos | 6,618,656 | B2 | 9/2003 | Kueblbeck et al. |
| 6,206,383 | B1 | 3/2001 | Burdock | 6,631,317 | B2 | 10/2003 | Lu |
| 6,219,604 | B1 | 4/2001 | Dilger et al. | 6,637,543 | B2 | 10/2003 | Card |
| 6,223,114 | B1 | 4/2001 | Boros et al. | 6,644,454 | B2 | 11/2003 | Yamada et al. |
| 6,226,579 | B1 | 5/2001 | Hackl et al. | 6,650,971 | B2 | 11/2003 | Haas |
| 6,227,482 | B1 | 5/2001 | Yamamoto | 6,654,674 | B2 | 11/2003 | Lu et al. |
| 6,232,875 | B1 | 5/2001 | DeZorzi | 6,657,539 | B2 | 12/2003 | Yamamoto et al. |
| 6,233,510 | B1 | 5/2001 | Platner et al. | 6,678,631 | B2 | 1/2004 | Schiffmann |
| 6,236,916 | B1 | 5/2001 | Staub et al. | 6,681,196 | B2 | 1/2004 | Glaser et al. |
| 6,263,261 | B1 | 7/2001 | Brown et al. | 6,681,881 | B2 | 1/2004 | Andonian et al. |
| 6,266,596 | B1 | 7/2001 | Hartman et al. | 6,698,542 | B2 | 3/2004 | Nishizaki et al. |
| 6,272,420 | B1 | 8/2001 | Schramm et al. | 6,704,631 | B2 | 3/2004 | Winner et al. |
| 6,278,930 | B1 | 8/2001 | Yamada et al. | 6,718,248 | B2 | 4/2004 | Lu |
| 6,282,471 | B1 | 8/2001 | Burdock et al. | 6,719,087 | B2 | 4/2004 | Demerly |
| 6,282,472 | B1 | 8/2001 | Jones et al. | 6,725,140 | B2 | 4/2004 | Lu et al. |
| 6,282,474 | B1 | 8/2001 | Chou et al. | 6,741,922 | B2 | 5/2004 | Holler |
| 6,290,019 | B1 | 9/2001 | Kolassa et al. | 6,745,624 | B2 | 6/2004 | Porter |
| 6,292,734 | B1 | 9/2001 | Murakami et al. | 6,747,553 | B2 | 6/2004 | Yamada et al. |
| 6,292,759 | B1 | 9/2001 | Schiffmann | 6,756,890 | B1 | 6/2004 | Schramm et al. |
| 6,311,111 | B1 | 10/2001 | Leimbach et al. | 6,766,875 | B2 | 7/2004 | Yamamoto |
| 6,314,329 | B1 | 11/2001 | Madau et al. | 6,784,794 | B1 | 8/2004 | McQuade |
| 6,315,373 | B1 | 11/2001 | Yamada et al. | 6,799,092 | B2 | 9/2004 | Lu |
| 6,321,141 | B1 | 11/2001 | Leimbach | 6,816,764 | B2 | 11/2004 | Coelingh et al. |
| 6,324,445 | B2 | 11/2001 | Tozu et al. | 6,834,218 | B2 | 12/2004 | Meyers et al. |
| 6,324,446 | B1 | 11/2001 | Brown et al. | 6,856,868 | B1 | 2/2005 | Le et al. |
| 6,324,458 | B1 | 11/2001 | Takagi et al. | 6,873,897 | B2 | 3/2005 | Faye et al. |
| 6,330,522 | B1 | 12/2001 | Takeuchi | 6,904,350 | B2 * | 6/2005 | Lu et al. ................ 701/70 |
| 6,332,104 | B1 | 12/2001 | Brown et al. | 7,109,856 | B2 * | 9/2006 | Lu et al. ................ 340/440 |
| 6,338,012 | B2 | 1/2002 | Brown et al. | 7,132,937 | B2 * | 11/2006 | Lu et al. ................ 340/440 |
| 6,349,247 | B1 | 2/2002 | Schramm et al. | 7,233,236 | B2 * | 6/2007 | Lu et al. ................ 340/440 |
| 6,351,694 | B1 | 2/2002 | Tseng et al. | 7,323,976 | B2 * | 1/2008 | Lu et al. ................ 340/446 |
| 6,352,318 | B1 | 3/2002 | Hosomi et al. | 2002/0109310 | A1 | 8/2002 | Lim |
| 6,356,188 | B1 | 3/2002 | Meyers et al. | 2003/0055549 | A1 | 3/2003 | Barta et al. |
| 6,360,147 | B1 | 3/2002 | Lee | 2003/0109939 | A1 | 6/2003 | Burgdorf et al. |
| 6,363,309 | B1 | 3/2002 | Irie et al. | 2003/0171865 | A1 | 9/2003 | Moser |
| 6,366,844 | B1 | 4/2002 | Woywod et al. | 2003/0182025 | A1 | 9/2003 | Tseng et al. |
| 6,370,938 | B1 | 4/2002 | Leimbach et al. | 2004/0010383 | A1 | 1/2004 | Lu |
| 6,394,240 | B1 | 5/2002 | Barwick | 2004/0019418 | A1 | 1/2004 | Lu |
| 6,397,127 | B1 | 5/2002 | Meyers et al. | 2004/0026158 | A1 | 2/2004 | Rieth et al. |
| 6,409,286 | B1 | 6/2002 | Fennel | 2004/0064246 | A1 | 4/2004 | Lu |
| 6,418,369 | B2 * | 7/2002 | Matsumoto et al. ......... 701/80 | 2004/0119335 | A1 | 6/2004 | Szabo et al. |
| 6,419,240 | B1 | 7/2002 | Burdock et al. | 2004/0158368 | A1 | 8/2004 | Haas |
| 6,424,897 | B1 | 7/2002 | Mattes et al. | 2004/0217647 | A1 | 11/2004 | Einig |
| 6,427,102 | B1 | 7/2002 | Ding | 2005/0033486 | A1 * | 2/2005 | Schmitt et al. ................ 701/1 |
| 6,428,118 | B1 | 8/2002 | Blosch | 2005/0273240 | A1 * | 12/2005 | Brown et al. ................ 701/70 |
| 6,433,681 | B1 | 8/2002 | Foo et al. | 2006/0074530 | A1 * | 4/2006 | Meyers et al. ................ 701/1 |
| 6,438,463 | B1 | 8/2002 | Tobaru et al. | 2006/0085112 | A1 * | 4/2006 | Lu et al. ................ 701/38 |
| 6,438,464 | B1 | 8/2002 | Woywod et al. | 2006/0089771 | A1 * | 4/2006 | Messih et al. ................ 701/45 |
| 6,456,194 | B1 | 9/2002 | Carlson et al. | 2006/0184299 | A1 * | 8/2006 | Wu et al. ................ 701/45 |
| 6,459,990 | B1 | 10/2002 | McCall et al. | | | | |
| 6,471,218 | B1 | 10/2002 | Burdock et al. | | | | |
| 6,477,480 | B1 | 11/2002 | Tseng et al. | | | | |
| 6,491,353 | B2 | 12/2002 | Hackl | DE | 38 15 938 | 11/1989 | |
| 6,496,758 | B2 | 12/2002 | Rhode et al. | DE | 43 21 571 | 1/1994 | |
| 6,496,763 | B2 | 12/2002 | Griessbach | DE | 42 27 886 | 2/1994 | |

FOREIGN PATENT DOCUMENTS

| | | |
|---|---|---|
| DE | 42 28 893 | 3/1994 |
| DE | 43 35 979 | 4/1995 |
| DE | 43 42 732 | 6/1995 |
| DE | 199 07 633 | 10/1999 |
| EP | 0 430 813 | 12/1993 |
| EP | 0 662 601 | 7/1995 |
| EP | 0 758 601 | 2/1997 |
| EP | 1 046 571 | 4/2000 |
| EP | 1 197 409 | 9/2001 |
| FR | 24 25 342 | 12/1979 |
| GB | 2257403 | 1/1993 |
| GB | 2 342 078 | 4/2000 |
| JP | 62055211 | 9/1985 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3045452 | 2/1991 |
| JP | 4008837 | 1/1992 |
| JP | 5016699 | 1/1993 |
| JP | 5254406 | 10/1993 |
| JP | 6278586 | 10/1994 |
| JP | 6297985 | 10/1994 |
| JP | 6312612 | 11/1994 |
| JP | 8080825 | 3/1996 |
| JP | 9005352 | 1/1997 |
| JP | 10024819 | 1/1998 |
| JP | 10329682 | 12/1998 |
| JP | 11011272 | 1/1999 |
| JP | 11170992 | 6/1999 |
| JP | 11254992 | 9/1999 |
| JP | 11255093 | 9/1999 |
| JP | 11304663 | 10/1999 |
| JP | 11304662 | 11/1999 |
| JP | 11321603 | 11/1999 |
| SU | 816849 | 3/1981 |
| WO | WO 02/20318 | 3/2002 |

OTHER PUBLICATIONS

U.S. Appl. No. 10/849,590, filed May 20, 2004, Brown.

A method for reducing on-road rollovers—anti-rollover braking, Thomas J. Wielenga, Dynamotive, LLC, International Congress and Exposition, Detroit, Michigan, Mar. 1-4, 1999.

Eger, R., Majjad, R., Naser, N., "Rollover simulation based on a nonlinear model", SAE 98020.

Nalecz, A.G., Bindemann, A.C., Brewer H.K., "Dynamic analysis of vehicle rollover", 12$^{th}$ International Conference on Experimental Safety Vehicles, Goteborg, Sweden, May 29-Jun. 1, 1989.

Niii, N., Nishijima, Y., Nakagaw, K., "rollover analysis method of a large-size bus", JSAE 9540020, 1995.

Eger, R., Kiencke, U., "Modeling of rollover sequences", Control Engineering Practice 11 (2003) 209-216.

Chen, Bo-Chiuan, Peng, Huei; "A Real-time Rollover Threat Index for Sports Utility Vehicles", Proceedings of the American Control Conference, San Diego, CA, Jun. 1999.

* cited by examiner

SYSTEM FOR DYNAMICALLY DETERMINING AXLE LOADINGS OF A MOVING VEHICLE USING INTEGRATED SENSING SYSTEM AND ITS APPLICATION IN VEHICLE DYNAMICS CONTROLS

TECHNICAL FIELD

The present invention relates generally to a control apparatus for controlling a system of an automotive vehicle in response to sensed dynamic behavior, and more specifically, to a method and apparatus for dynamically determining the normal axle or wheel loading and controlling a vehicle system dynamics behavior based on the detected normal loading.

BACKGROUND

Various automotive vehicles have recently begun including vehicle dynamic control systems. Such vehicle dynamic control systems include yaw stability control systems, roll stability control systems, integrated vehicle dynamic control systems, etc. The ongoing goal of vehicle control systems is to achieve a coordinated system level vehicle performance for ride, handling, safety and fuel economy.

With current advances in mechatronics, vehicle controls have increased opportunities for achieving control performances using the information and the control strategies which were previously reserved for spacecraft and aircraft. For example, gyro sensors, previously only used in aircraft, have now been incorporated in various vehicle controls, and the anti-lock brake systems once invented for airplanes are now standard automotive control systems. Current sensor technology generates ever-increasing opportunities for vehicle control. A typical vehicle control system has to sense three-dimensional dynamic vehicle motions in order to achieve high control performance and high accuracy/precision dynamics control. For example, during yaw stability and roll stability controls, the control task involves three-dimensional motions along the vehicle roll, pitch, and yaw directions and along the vehicle longitudinal, lateral and vertical directions.

The axle loading (or the vertical loading) of a moving vehicle can be directly measured by force or load measuring systems (for example, as in U.S. Pat. No. 5,265,481 or U.S. Pat. No. 5,002,141). Such systems are very expensive and usually are not cost feasible for on-vehicle implementation.

The need for sensing axle/wheel loadings of a moving vehicle is desirable in various vehicle dynamics control systems. One application of such sensing is in a roll stability control application. A roll stability control system controls the rollover characteristics of a vehicle in order to maintain its position with respect to the road, i.e., to alter the vehicle roll condition such that its motion along the roll direction is prevented from achieving a predetermined limit (rollover limit) with the aid of the actuation from the available active systems such as controllable brake system, steering system, suspension system, etc. Since the available active control systems need to deliver other normal functions (for example, a brake system needs to conduct anti-lock braking, traction control, yaw stability control, etc), it is desired that the rollover control function is only conducted on-demand, i.e., when the potential vehicular rollover happens and is turned off when the vehicle is driving in normal conditions or in the conditions outside the activation criteria of roll stability control. Therefore, the identification of a rollover condition becomes a very important factor for the successful implementation of roll stability control system. A rollover happens when the vehicle loses wheel loading at one or two wheels at the same side of the vehicle and the vehicle roll angle diverges. An on-vehicle and real-time sensing of the wheel loadings can be used to detect such pre-rollover characteristics. That is, if the predicted wheel loading or loadings are significantly smaller than its nominal value, a potential rollover condition is identified.

Another application of the axle and wheel normal loading determination is to conduct brake distribution for anti-lock brake or yaw stability control systems.

A further application of the axle and wheel loading determination is wheel control in a vehicle with a controllable suspension. The interaction between the wheel and the road plays a key role for a vehicle to maximize its stability during handling maneuvers and for a vehicle to reduce road damage (especially for heavy trucks). This performance requirement has become practical nowadays with the implementation of controllable suspensions. The performance requirement is to maintain constant axle/wheel loadings. In order to achieve such performance, feedback control signals need to be constructed from the axle/wheel loadings. Hence, dynamically determining the axle/wheel loading is required.

The fourth need for dynamically determining the axle and wheel loadings of a moving vehicle is in accurately characterizing the tire forces between the tires and the road surface. Wheel loading detection together with the real time information of the driving torque delivered to a driven wheel allows the prediction of a surface mu (coefficient of friction, µ). Knowing the surface mu is desirable for various stability control applications of vehicles.

Therefore, it is desirable to obtain a real time prediction or dynamic determination of the axle/wheel loadings of a moving vehicle without using load sensors but using available sensor signals form the various dynamic control systems and some of the calculated signals from the available sensor signals.

SUMMARY

The present invention provides a method and system to dynamically predict the axle and wheel loadings of a moving vehicle indirectly by using the available sensors typically equipped in an integrated vehicle dynamics control system.

In one aspect of the invention, a method of controlling a vehicle includes determining a heave motion wheel loading, determining an attitude-based wheel loading, determining a wheel vertical motion induced wheel loading, and determining a total wheel normal loading in response to the heave motion wheel loading, the attitude-based wheel loading, and the wheel vertical motion induced wheel loading. A vehicle system is controlled in response to the total wheel normal loading.

In a further aspect of the invention, a vehicle has a sprung mass, a spring rate, a wheel assembly mass, a suspension, a body and suspension point where the suspension couples to the body, half track, a center of gravity, a longitudinal distance between the center of gravity and the axle, vertical distance between the center of gravity and the suspension point. A method using the vehicle includes determining a relative pitch angle, determining a relative roll angle, and determining a vertical acceleration. A heave motion is determined in response to the sprung mass and the vertical acceleration. An attitude-based wheel loading is determined in response to the spring rate and the half track of the longitudinal distance between the center of gravity and the axle. A vertical wheel motion induced wheel loading is determined in response to the wheel assembly mass and the vertical acceleration derived from the vertical distance between the center of gravity and the suspension point. A total wheel normal loading is determined in response to the heave motion wheel loading, the attitude-based wheel loading, and the vertical motion induced wheel loading. The vehicle system is controlled in response to the total wheel normal loading. It should be noted that the normal loading may be determined for each of the wheels. Each of the wheels on a particular axle may be determined. It should also be noted that the term "axle" is used for the front wheels or the rear wheels. No physical separate axle may actually be present.

One advantage of the invention is that no additional sensors in addition to the dynamic control system sensors are required for the system. Therefore, the total wheel normal loading may be determined in a cost effective manner.

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
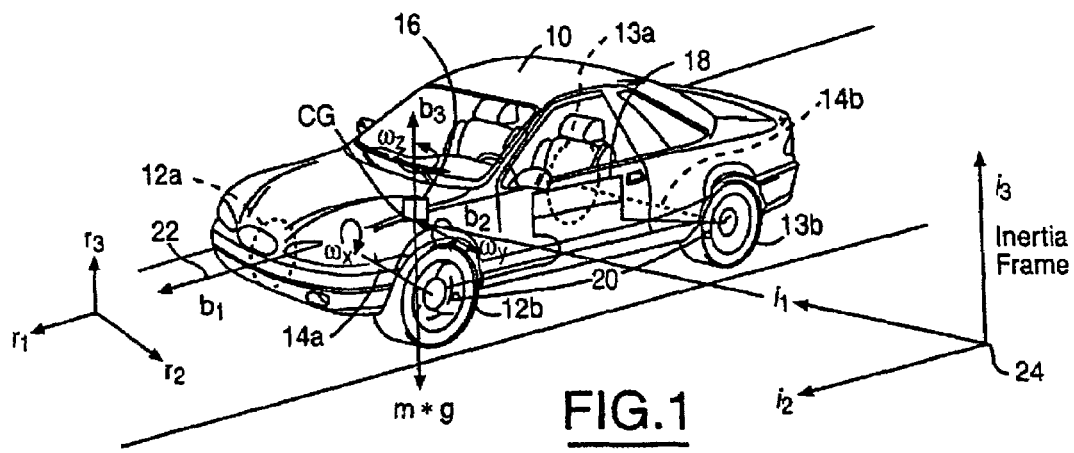
FIG. 1 is a diagrammatic view of a vehicle with variable vectors and coordinate frames according to the present invention.

In the following figures the same reference numerals will be used to identify the same components. The present invention is preferably used in conjunction with vehicle control systems, which include, but are not limited to a yaw stability control system, a roll stability control system, an integrated vehicle dynamics control system, or a total vehicle control system for achieving fuel economy and safety and other vehicle level performances. The system is also described with respect to an inertial measurement unit (IMU) or integrated sensing system (ISS). However, discrete sensors may also be used to implement the present invention.

Referring to FIG. 1, an automotive vehicle 10 with a safety system of the present invention is illustrated with the various forces and moments thereon during a rollover condition. Vehicle 10 has front right (FR) and front left (FL) wheel/tires 12A and 12B and rear right (RR) wheel/tires 13A and rear left (RL) wheel/tires 13B, respectively. The vehicle 10 may also have a number of different types of front steering systems 14a and rear steering systems 14b, including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa.

Generally, the vehicle has a weight represented as Mg at the center of gravity of the vehicle, where g=9.8 m/s² and M is the total mass of the vehicle.

As mentioned above, the system may also be used with safety systems including active/semi-active suspension systems, anti-roll bar, or airbags or other safety devices deployed or activated upon sensing predetermined dynamic conditions of the vehicle.

The sensing system 16 is coupled to a control system 18. The sensing system 16 may comprise many different sensors including the sensor set typically found in a roll stability control or a rollover control system (including lateral accelerometer, yaw rate sensor, steering angle sensor and wheel speed sensor which are equipped for a traditional yaw stability control system) together with a roll rate sensor a pitch rate sensor and a longitudinal accelerometer. The various sensors will be further described below. The sensors may also be used by the control system in various determinations such as to determine a lifting event, determine normal forces on the wheels, determine a height and position of a mass, etc. The wheel speed sensors 20 are mounted at each corner of the vehicle and generate signals corresponding to the rotational speed of each wheel. The rest of the sensors of sensing system 16 may be mounted directly on the center of gravity of the vehicle body, along the directions x,y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. Calculations may take place in an inertial frame 24 that may be derived from the body frame 22 as described below.

The roll, pitch and yaw angular rate sensors and the lateral, longitudinal, and vertical accelerometers may be mounted on the vehicle car body along the body frame directions $b_1$, $b_2$ and $b_3$ which are the x-y-z axes of the sprung mass of the vehicle. The sensors may be in an IMU or ISS or discrete sensors. The sensors may be off the center of gravity but numerically translated to the center of gravity.

The longitudinal acceleration sensor is mounted on the car body located at the center of gravity, with its sensing direction along $b_1$ axis, whose output is denoted as $a_x$. The lateral acceleration sensor is mounted on the car body located at the center of gravity, with its sensing direction along $b_2$ axis, whose output is denoted as $a_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four-tire/road contact patches.

In the following discussion, the Euler angles of the body frame $b_1 b_2 b_3$ with respect to the road frame $r_1 r_2 r_3$ are denoted as $\theta_{xbr}$ and $\theta_{ybr}$, which are also called the relative Euler angles (i.e., relative roll and relative pitch angles, respectively).

Figure 2:
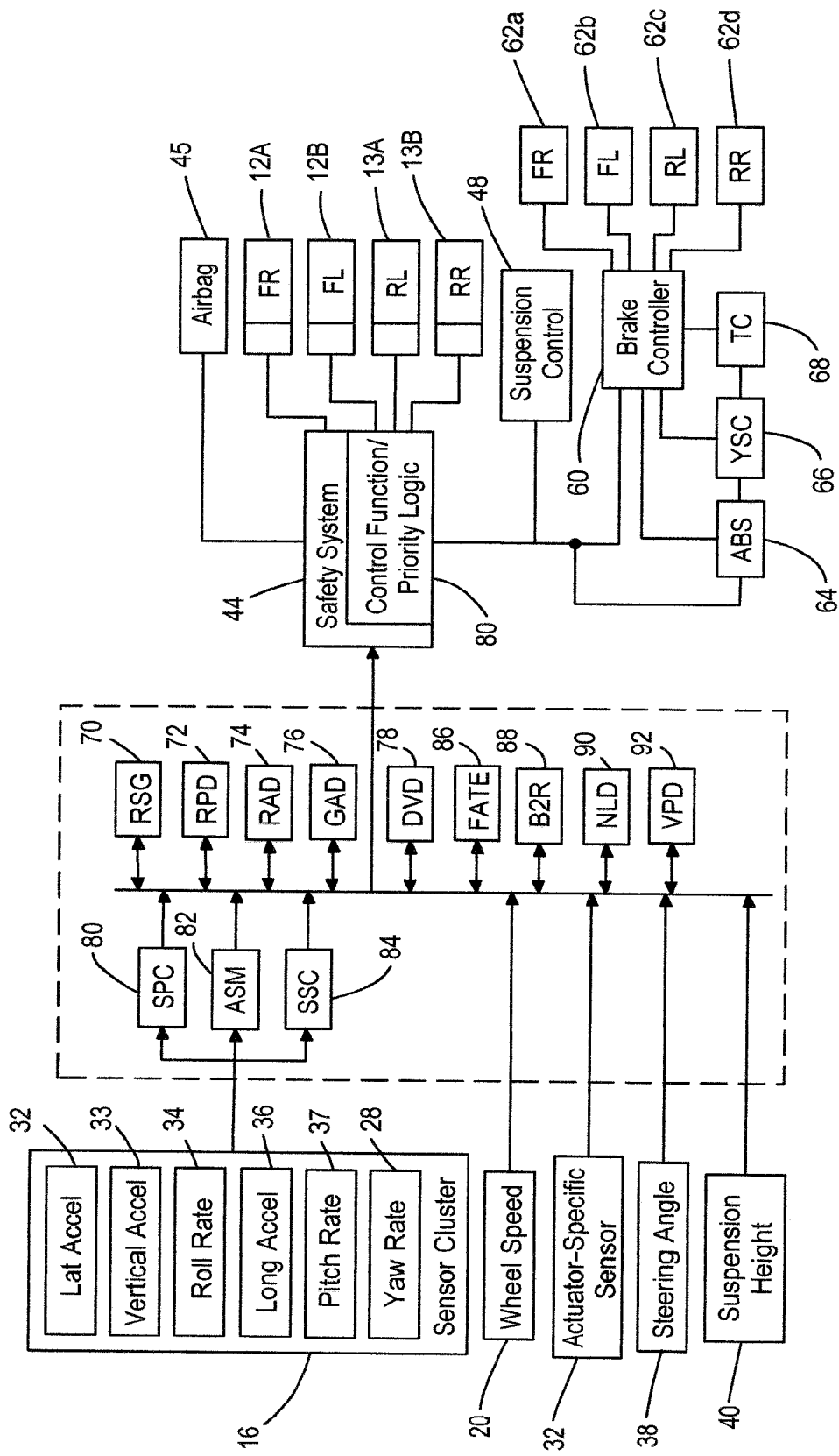
FIG. 2 is a block diagram of a stability system according to the present invention.

Referring now to FIG. 2, control system 18 is illustrated in further detail having a controller 26 used for receiving information from a number of sensors which may include a yaw rate sensor 28, a speed sensor 20, a lateral acceleration sensor 32, a vertical accelerometer sensor 33, a roll angular rate sensor 34, a longitudinal acceleration sensor 36, a pitch rate sensor 37, steering angle (of the wheels or actuator) position sensor 38, a suspension position (height) sensor 40. It should be noted that various combinations and sub-combinations of the sensors may be used.

The sensor cluster 16 may be within a housing, and includes a roll rate sensor 34 generating a roll rate signal, a pitch rate sensor 37, generating a pitch rate signal, a yaw rate sensor 28 generating a yaw rate signal, a longitudinal acceleration sensor 36 generating a longitudinal acceleration signal, a lateral acceleration sensor 32 generating a lateral acceleration signal, and a vertical acceleration sensor 33 generating a vertical acceleration signal.

If discrete or individual sensors are used lateral acceleration, roll orientation and speed may be obtained using a global positioning system (GPS). Based upon inputs from the sensors, controller 26 may control a safety device 44. Depending on the desired sensitivity of the system and various other factors, not all the sensors may be used in a commercial embodiment. Safety device 44 may control an airbag 45 or a steering actuator 46A-46D at one or more of the wheels 12A, 12B, 13A, 13B of the vehicle. Also, other vehicle components such as a suspension control 48 may be used to adjust the suspension to prevent rollover.

Roll angular rate sensor 34 and pitch rate sensor 37 may sense the roll condition or lifting of the vehicle based on sensing the height of one or more points on the vehicle relative to the road surface. Sensors that may be used to achieve this include but are not limited to a radar-based proximity sensor, a laser-based proximity sensor and a sonar-based proximity sensor. The roll rate sensor 34 may also use a combination of sensors such as proximity sensors to make a roll rate determination.

Roll rate sensor 34 and pitch rate sensor 37 may also sense the roll condition or lifting based on sensing the linear or rotational relative displacement or displacement velocity of one or more of the suspension chassis components. This may be in addition to or in combination with suspension position sensor 40. The suspension position sensor 40, roll rate sensor 34 and/or the pitch rate sensor 37 may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The yaw rate sensor 28, the roll rate sensor 34, the lateral acceleration sensor 32, and the longitudinal acceleration sensor 36 may be used together to determine that the wheel has lifted. Such sensors may be used to determine wheel lift or estimate normal loading associated with wheel lift.

The roll condition such as the relative roll angle of the vehicle may also be established by one or more of the following translational or rotational positions, velocities or accelerations of the vehicle including a roll gyro, the roll rate sensor 34, the yaw rate sensor 28, the lateral acceleration sensor 32, the vertical acceleration sensor 33, a vehicle longitudinal acceleration sensor 36, lateral or vertical speed sensor including a wheel-based speed sensor 20, a radar-based speed sensor, a sonar-based speed sensor, a laser-based speed sensor or an optical-based speed sensor.

Controller 26 may include sensing algorithms including but not limited to reference attitude and reference directional velocity determinations, global/relative attitude determination, directional velocity determination, sensor plausibility check, sensor signal conditioning, sensor error compensation, road profile, surface condition determination, and abnormal state monitoring.

The controller 26 includes various control units controlling the aforementioned sensing algorithms. These units may include: a reference signal unit 70 (reference signal generator (RSG)), which includes an attitude reference computation and a velocity reference computation, a road profile unit 72 (road profile determination unit (RPD)), an attitude unit or relative attitude determination unit 74 (RAD), a global attitude unit 76 (global attitude determination unit (GAD)) and a directional unit 78 (directional velocity determination unit (DVD)), a sensor plausibility unit 80 (sensor plausibility check unit (SPC)), an abnormal state unit 82 (abnormal state monitoring unit (ASM)), a sensor signal compensating unit 84 (SSC), an estimation unit 86 (force and torque estimation unit (FATE)), a car body to fixed reference frame unit 88 (body to reference unit (B2R)), a normal loading unit 90 (normal loading determination unit (NLD)), and a vehicle parameter unit 92 (vehicle parameter determination unit (VPD)). Signals generated from any one of the aforementioned units are referred to prediction of vehicle operation states signals. The present invention lies primarily in the normal loading detection unit (NLD) 90.

Safety device 44 may control the position of the front right wheel actuator 46A, the front left wheel actuator 46B, the rear left wheel actuator 46C, and the right rear wheel actuator 46D. Although as described above, two or more of the actuators may be simultaneously controlled. For example, in a rack-and-pinion system, the two wheels coupled thereto are simultaneously controlled. Based on the inputs from sensors 28 through 43B, controller 26 determines a roll condition and/or wheel lift and controls the steering position and/or braking of the wheels.

Safety device 44 may be coupled to a brake controller 60. Brake controller 60 controls the amount of brake torque at a front right brake 62a, front left brake 62b, rear left brake 62c and a rear right brake 62d. Other safety systems such as an antilock brake system 64, a yaw stability control system 66 and a traction control system 68 may also benefit from the knowledge of the roll gradient, roll rate parameter, roll acceleration coefficient, additional mass and position of the mass. This information may impact the control strategy such as modifying the brake force.

Speed sensor 20 may be one of a variety of speed sensors known to those skilled in the art. For example, a suitable speed sensor may include a sensor at every wheel that is averaged by controller 26. The controller may translate the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

The roll condition of a vehicle can be characterized by the relative roll angle between the vehicle body and the wheel axle and the wheel departure angle (between the wheel axle and the average road surface). Both the relative roll angle and the wheel departure angle may be calculated in relative roll angle estimation module (RAD 74) by using the roll rate and lateral acceleration sensor signals. If both the relative roll angle and the wheel departure angles are large enough, the vehicle may be in either single wheel lifting or double wheel lifting. On the other hand, if the magnitude of both angles is small enough, the wheels are likely all grounded. In case that both of them are not small and the double wheel lifting condition is detected or determined, the sum of those two angles will be used by the feedback control module to compute the desired actuation command for achieving rollover control performance.

The roll condition of a vehicle can be characterized by rolling radius-based wheel departure roll angle, which captures the angle between the wheel axle and the average road surface through the dynamic rolling radii of the left and right wheels when both of the wheels are grounded. Since the computation of the rolling radius is related to the wheel speed and the linear velocity of the wheel, such rolling-radius based wheel departure angle will assume abnormal values when there are large wheel slips. This happens when a wheel is lifted and there is torque applied to the wheel. Therefore, if this rolling radius-based wheel departure angle is increasing rapidly, the vehicle might have lifted wheels. Small magnitude of this angle indicates the wheels are all grounded.

The roll condition of the vehicle can be seen indirectly from the wheel longitudinal slip. If during a normal braking or driving torque the wheels at one side of the vehicle experience increased magnitude of slip, then the wheels of that side are losing longitudinal road torque. This implies that the wheels are either driven on a low mu surface or lifted up. The low mu surface condition and wheel-lifted-up condition can be further differentiated based on the chassis roll angle computation, i.e., in low mu surface the chassis roll angle is usually very small. Hence, an accurate determination of chassis roll is desired.

The roll condition of the vehicle can be characterized by the normal loading sustained at each wheel. Theoretically, when a normal loading at a wheel decreases to zero, the wheel is no longer contacting the road surface. In this case a potential rollover is underway. Large magnitude of this loading indicates that the wheel is grounded. Normal loading is a function of the calculated chassis roll and pitch angles. Hence, an accurate determination of chassis roll and pitch angles is desired.

The roll condition can be identified by checking the actual road torques applied to the wheels and the road torques, which are needed to sustain the wheels when they are grounded. The actual road torques can be obtained through torque balancing for each wheel using wheel acceleration, driving torque and braking torque. If the wheel is contacting the road surface, the calculated actual road torques must match or be larger than the torques determined from the nonlinear torques calculated from the normal loading and the longitudinal slip at each wheel.

The roll condition of a vehicle can be characterized by the chassis roll angle itself, i.e., the relative roll angle $\theta_{xr}$ between the vehicle body and the wheel axle. If this chassis roll angle is increasing rapidly, the vehicle might be on the edge of wheel lifting or rollover. Small magnitude of this angle indicates the wheels are not lifted or are all grounded. Hence, an accurate determination of the chassis roll angle is beneficial for determining if the vehicle is in non-rollover events.

The roll condition of a vehicle can also be characterized by the roll angle between the wheel axle and the average road surface, this is called wheel departure angle. If the roll angle is increasing rapidly, the vehicle has lifted wheel or wheels and aggressive control action needs to be taken in order to prevent the vehicle from rolling over. Small magnitude of this angle indicates the wheels are not lifted.

The center of gravity C is also illustrated with nominal mass M. A roll axis is also illustrated at a distance D from the center of gravity. The symbol $a_y$ is the lateral acceleration.

The safety device may include control function/priority logic. As illustrated, the logic resides within safety device 44, but may be part of controller 26 and/or brake controller 60.

Figure 3:
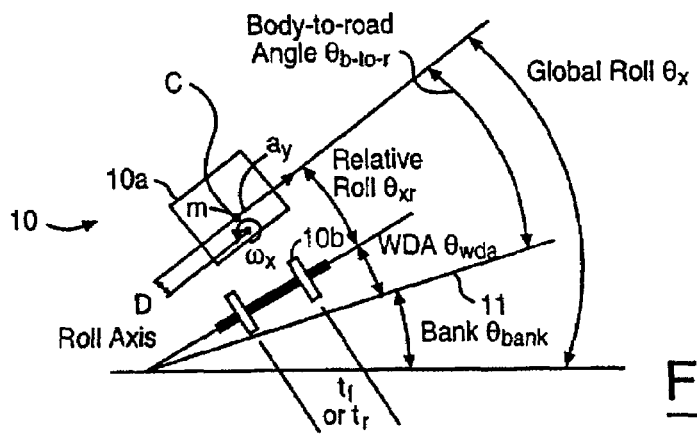
FIG. 3 is a front view of an automotive vehicle illustrating various angles according to the present invention.

Referring now to FIG. 3, the relationship of the various angles of the vehicle 10 relative to the road surface 11 is illustrated. In the following, a reference road bank angle $\theta_{bank}$ is shown relative to the vehicle 10 on a road surface. The vehicle has a vehicle body 10a and wheel axle 10b. The wheel departure angle $\theta_{wda}$ is the angle between the wheel axle and the road. The relative roll angle $\theta_{xr}$ is the angle between the wheel axle 10b and the body 10a. The global roll angle $\theta_x$ is the angle between the horizontal plane (e.g., at sea level) and the vehicle body 10a.

Another angle of importance is the linear bank angle. The linear bank angle is a bank angle that is calculated more frequently (perhaps in every loop) by subtracting the relative roll angle generated from a linear roll dynamics of a vehicle (see U.S. Pat. No. 6,556,908 which is incorporated by reference herein), from the calculated global roll angle (as one in U.S. Pat. No. 6,631,317 which is incorporated by reference herein). If all things were slowly changing without drifts, errors or the like, the linear bank angle and reference road bank angle terms would be equivalent.

During an event causing the vehicle to roll, the vehicle body is subject to a roll moment due to the coupling of the lateral tire force and the lateral acceleration applied to the center of gravity of vehicle body. This roll moment causes suspension height variation, which in turn results in a vehicle relative roll angle (also called chassis roll angle or suspension roll angle). The, relative roll angle is an important variable that is used as an input to the activation criteria and to construct the feedback brake pressure command, since it captures the relative roll between the vehicle body and the axle. The sum of such a chassis roll angle and the roll angle between wheel axle and the road surface (called wheel departure angle) provides the roll angle between the vehicle body and the average road surface, which is one of the important variables feeding back to the roll stability control module.

The relative or chassis roll angle and the relative pitch angle can be calculated as in U.S. Pat. No. 6,556,908 using the lateral acceleration of the center of gravity of the vehicle body, the roll angular acceleration, and the roll angular velocity, together with vehicle-specific parameters such as the sprung mass, the vehicle body roll moment of inertia, the roll stiffness and damping ratio of the suspensions and the anti-roll-bars, and the distance between the center of gravity of the vehicle body and the floor of the vehicle body. The disclosure of U.S. Pat. No. 6,556,908 is hereby incorporated by reference.

Figure 4:
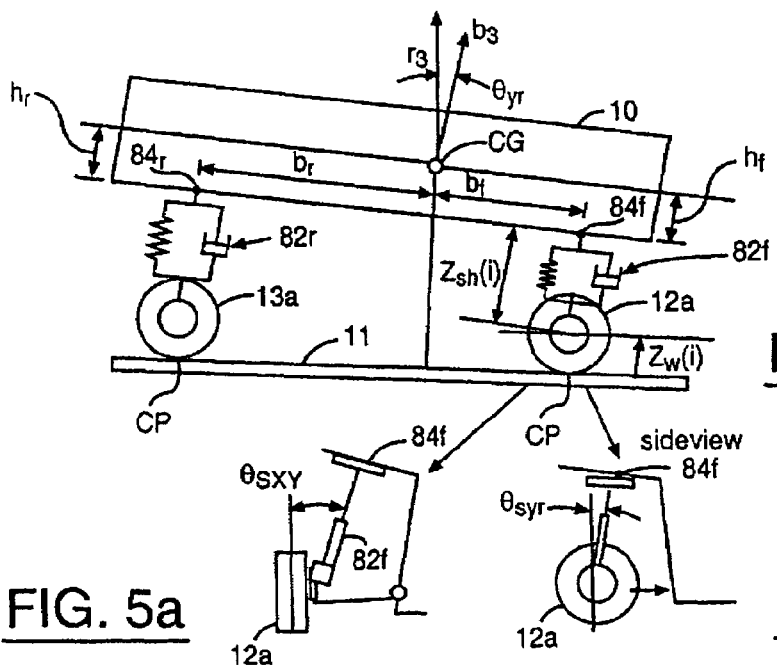
FIG. 4 is a side view of an automotive vehicle illustrating various variables thereon.

Referring now to FIGS. 4 and 5, an automotive vehicle 10 is illustrated with various parameters illustrated thereon. The side view of automotive vehicle 10 is illustrated. A front suspension 82f and a rear suspension 82r are illustrated. The suspensions are coupled to the body at a respective suspension point 84f, 84r. The distance from the suspension point 84f to the center of the wheel is labeled $z_{sh}$. The distance from the center of gravity CG to the front suspension is labeled as $b_f$. The distance from the CG to the rear suspension point 84r is labeled as $b_r$. The vertical distance between the center of gravity and the suspension point are labeled respectively as $h_f$ and $h_r$. A portion of the body axis $b_3$ and the road axis $r_3$ are illustrated. The angle therebetween is the relative pitch angle $\theta_{yr}$. The rolling radius of the tire is labeled as $z_w$.

Figure 5A:
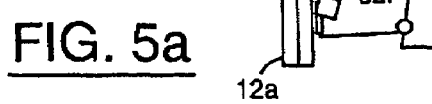
FIG. 5A is a back elevational view of a suspension and tire assembly.
Figure 5B:
FIG. 5B is a side elevational view of the tire and suspension assembly of FIG. 5A.

Referring now to FIGS. 5A and 5B, a back view of the wheel 12a is illustrated relative to suspension 82f which has the suspension point 84f. A relative roll angle of the suspension is illustrated as $\theta_{sxr}$. The relative pitch angle $\theta_{syr}$ is illustrated in FIG. 5B.

The axle/wheel loading here means the dynamic normal loading which is experienced by any of the four wheels during vehicle dynamic maneuvers or during normal driving conditions. Those axle/wheel loadings are measured along the normal directions of the contact patches (CP), which are the areas where the wheels and the road surface meet. If the vehicle is driven on a level ground, thus defined axle/wheel loadings are along the vertical direction which is perpendicular to the road surface. The term axle/wheel load is used in this application to mean one or the other or both. As is illustrated below, the axle loading is determined by adding the wheel loadings at each axle together.

Figure 6:
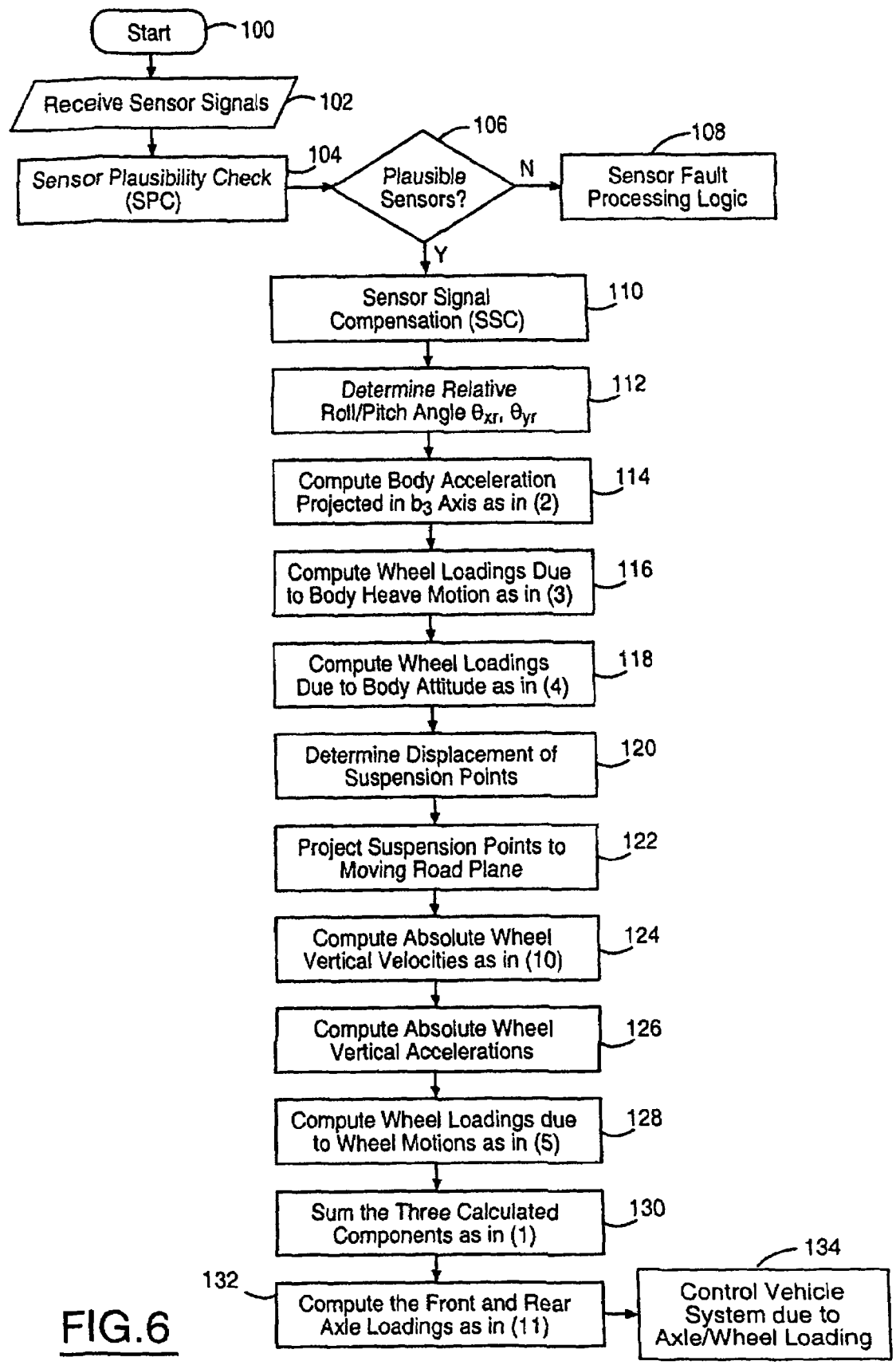
FIG. 6 is a logic flow diagram of a method for controlling a vehicle dynamic system in accordance with another embodiment of the present invention.

Referring now to FIG. 6, the method of the present invention begins in start block 110. In step 102, signals from the various sensors are received. In step 104, the plausibility of each of the sensors is determined. In step 106, if the sensor signals are not plausible, step 108 is executed in which sensor fault processing logic is performed. In step 110, sensor signal compensation is performed. Sensor signal compensation may include compensating the sensor signals for various offsets, sensor noise and sensor misalignment with respect to the vehicle body frame.

The wheel loading of each wheel consists of three portions: the portion due to the heave motion of the vehicle (denoted as $N_{heave}$), the portion due to the attitude of the vehicle (denoted as $N_{attitude}$) and the portion due to the vertical motion of the wheels (denoted as $N_{wheel}$). That is, the total wheel loading at the ith wheel (denoted as $N_{total}$) is the following total sum:

$$N_{total}(i) = N_{heave}(i) + N_{attitude}(i) + N_{wheel}(i) \quad (1)$$

where the index i=0, 1, 2, 3 indicating the front-left, front-right, rear-left and rear-right wheels of the vehicle.

The acceleration outputs from sensor signal compensation unit based on the IMU or sensors measure the vehicle body directional accelerations at sensor location along the body-fixed axes and are denoted about their respective axes as $a_{x-BFF}^{sl}$ for longitudinal acceleration, $a_{y-BFF}^{sl}$ for lateral acceleration, and $a_{z-BFF}^{sl}$ for vertical acceleration. These accelerations can be transformed to the ones at the location of the center of gravity of the vehicle body. The wheel speed sensors are mounted at wheel locations and are denoted as $w_{lf}$, $w_{rf}$, $w_{lr}$, $w_{rr}$ for left-front, right-front, left-rear and right-rear wheels, respectively. The four suspension height sensors $z_{sh}(0)$, $z_{sh}(1)$; $z_{sh}(2)$ and $z_{sh}(3)$ measure the distances between the two ends of the front-left, front-right, rear-left and rear-right suspensions.

A road-moving-frame, moves and yaws with the vehicle body but parallel with the average road surface. Such a frame is called a moving road frame or short to MRF. The attitude of the vehicle relative to the road surface can be captured by the Euler angles in order to transfer the moving road frame to the body-fixed frame. Those relative attitudes can be calculated from the Relative Attitude Determination (RAD) unit in the ISS system.

Using the relative roll angle $\theta_{xr}$ and the relative pitch angle is $\theta_{yr}$, the vertical accelerations of the vehicle body projected on the vertical direction of the moving-road-frame can be calculated from the body-fixed signals in step 114 as:

$$a_{z-MRF} = a_{x-BFF}\sin(\theta_{yr}) + a_{y-BFF}\sin(\theta_{xr})\cos(\theta_{yr}) + a_{z-BFF}\cos(\theta_{xr})\cos(\theta_{yr}) \quad (2)$$

In step 116 the heave motion generated wheel loading can be calculated as the following:

$$N_{heave}(0) = N_{heave}(1) = Ma_{z-MRF}\frac{b_r}{2(b_f + b_r)} \quad (3)$$

$$N_{heave}(2) = N_{heave}(3) = Ma_{z-MRF}\frac{b_r}{2(b_f + b_r)}$$

where $a_{z-MRF}$ is a vertical acceleration of the vehicle body c.g. but measured along the vertical axis of the moving road frame; M is the sprung mass of the vehicle; $\theta_{xr}$ is the relative roll angle between the vehicle body and the road surface; $\theta_{yr}$ is the relative pitch angle between the vehicle body and the road surface; $b_f$ is the distance of the vehicle c.g. from the front axle, and $b_r$ is the distance of the vehicle c.g. from the rear axle.

The non-heave motion portion of the normal loadings are due to the other motion of the vehicle, including the roll and pitch angular motion of the vehicle body with respect to the road surface, the load transfers due to the longitudinal and lateral accelerations. The wheel loadings due to body attitude may be determined in step 118 as:

$$N_{attitude}(0) = K_f(-\theta_{xr}t_f + \theta_{yr}b_f)\cos(\theta_{xr})\cos(\theta_{yr})$$

$$N_{attitude}(1) = K_f(\theta_{xr}t_f + \theta_{yr}b_f)\cos(\theta_{xr})\cos(\theta_{yr})$$

$$N_{attitude}(2) = K_r(-\theta_{xr}t_r - \theta_{yr}b_r)\cos(\theta_{xr})\cos(\theta_{yr})$$

$$N_{attitude}(3) = K_r(\theta_{xr}t_r - \theta_{yr}b_r)\cos(\theta_{xr})\cos(\theta_{yr}) \quad (4)$$

where $K_f$ is the spring rate of the front suspensions and $K_r$ is the spring rate of the rear suspensions.

The vertical motion induced normal loading can be expressed as:

$$N_{wheel}(0) = M_{wf}\ddot{z}_w(0)$$

$$N_{wheel}(1) = M_{wf}\ddot{z}_w(1)$$

$$N_{wheel}(2) = M_{wr}\ddot{z}_w(2)$$

$$N_{wheel}(3) = M_{wr}\ddot{z}_w(3) \quad (5)$$

where $M_{wf}$ and $M_{wr}$ are the masses of the wheel/suspension assemblies for each front and rear wheel, respectively, and $z_w(i)$ denotes the vertical displacement of the ith wheel defined along the vertical axis of the moving road frame but with respect to the inertia frame. The vertical displacement $z_w(i)$ for i=0, 1, 2, 3 and it acceleration $\ddot{z}_w$ must then be calculated.

The absolute displacements of the four suspension points are determined in step 120 (on the vehicle body where the suspensions intersect with the bottom of the vehicle body). In the body-fixed frame those four points can be described by the following coordinates:

LF Corner: $x(0) = b_f$, $y(0) = t_f$, $z(0) = -h_f$

RF Corner: $x(1) = b_f$, $y(1) = -t_f$, $z(1) = -h_f$

LR Corner: $x(2) = -b_r$, $y(2) = t_r$, $z(2) = -h_r$

RR Corner: $x(3) = -b_r$, $y(3) = -t_r$, $z(3) = -h_r$ (6)

where $h_f$ and $h_r$ are the distances between the c.g. location of the body and the places where front and rear suspensions intersect with the vehicle body, $t_f$ and $t_r$ are the half track of the front and rear axles, $b_f$ and $b_r$ the distance from the c.g. of the body to the front and rear axles.

Along the vertical axis of the moving road frame, the distances between the c.g. location of the body and the places where front and rear suspensions intersect with the vehicle body can be expressed as the following using the Euler transformation in step 122 and the coordinates in (6):

$$z_{bc-MRF}(i) = -x(i)\sin(\theta_{yr}) + y(i)\sin(\theta_{xr})\cos(\theta_{yr}) + z(i)\cos(\theta_{xr})\cos(\theta_{yr}) \quad (7)$$

where $\theta_{xr}$ and $\theta_{yr}$ are the roll and pitch Euler angles between the vehicle body frame and the moving road frame, which are calculated as mentioned above.

The distance between the vehicle body c.g. and the sea level or an inertia frame but along the vertical axis of the moving road is $z_{cg-MRF}$. The relative distances between the points where the suspensions intersecting the vehicle body and the road surface along the vertical axis of the moving road may be expressed as:

$$z_{c-MRF}(i) = z_{cg-MRF} + z_{bc-MRF} \quad (8)$$
$$= z_{cg-MRF} - x(i)\sin(\theta_{yr}) + y(i)\sin(\theta_{xr})\cos(\theta_{yr}) +$$
$$z(i)\cos(\theta_{xr})\cos(\theta_{yr})$$

The velocity $\dot{z}_{cg-MRF}$ can be calculated from the body-fixed longitudinal velocity $v_{x-BFF}$, lateral velocity $v_{y-BFF}$ and vertical velocity $v_{z-BFF}$ obtained in the directional velocity determination (DVD) unit of the integrated sensing system as in the following:

$$\dot{z}_{cg-MRF} = v_{z-MRF} = v_{x-BFF}\sin(\theta_{yr}) +$$
$$v_{y-BFF}\sin(\theta_{xr})\cos(\theta_{yr}) + v_{z-BFF}\cos(\theta_{xr})\cos(\theta_{yr}) \quad (9)$$

Projecting the ith suspension height to the moving-road frame, we obtain the following $$z_{sh-MRF}(i) = z_{sh}(i)\cos(\theta_{xr} - \theta_{sxr0}(i))\cos(\theta_{yr} - \theta_{syr0}(i))$$

where $\theta_{sxr0}(i)$ and $\theta_{syr0}(i)$ are the initial . . . angles of the suspension.

The velocity of the point at the body such that the ith suspension intersects with the body floor and the wheel vertical velocity along the vertical axis of the road is set forth in step 124. The following computation of the ith wheel vertical velocity:

$$\dot{z}_w(i) = \dot{z}_{c-MRF}(i) - \dot{z}_{sh-MRF}(i) \quad (10)$$
$$= v_{z-MRP} + \frac{d[z_{bc}(i)]}{dt} -$$
$$\frac{d[z_{sh}(i)\cos(\theta_{xr} - \theta_{sxr0}(i))\cos(\theta_{yr} - \theta_{syr0}(i))]}{dt}$$
$$= v_{z-MRP} + [y(i)(\cos(\theta_{xr})\sin(\theta_{yr}) - z(i)\sin(\theta_{xr})\cos(\theta_{yr}))]\dot{\theta}_{xr} -$$
$$[x(i)\cos(\theta_{yr}) + y(i)\sin(\theta_{xr})\sin(\theta_{yr}) + z(i)\cos(\theta_{xr})\sin(\theta_{yr})]\dot{\theta}_{yr} -$$
$$\cos(\theta_{xr} - \theta_{sxr0}(i))\cos(\theta_{yr} - \theta_{syr0}(i))\dot{z}_{sh}(i) +$$
$$\sin(\theta_{xr} - \theta_{sxr0}(i))\cos(\theta_{yr} - \theta_{syr0}(i))\dot{\theta}_{xr}z_{sh}(i) +$$
$$\cos(\theta_{xr} - \theta_{sxr0}(i))\sin(\theta_{yr} - \theta_{syr0}(i))\dot{\theta}_{yr}z_{sh}(i)$$

Using Equation (10) the acceleration $\ddot{z}_w$ may then be determined in step 126 by taking the derivative of $\dot{z}_w$. Hence, using thus calculated $\ddot{z}_w(i)$, the wheel loadings due to the wheel motions can be computed by using (5) in step 128. Using equations set forth in (1) for each wheel the normal loading may be determined in step 130. The front and rear axle loadings can be computed in step 132 as:

$$N_{front-axle} = N(0) + N(1)$$
$$N_{rear-axle} = N(2) + N(3) \quad (11)$$

In step 134 the various vehicle systems are controlled using the axle or wheel loading. For example, a safety system 80 may be controlled. The safety system may include a dynamic control system such as an ABS system, a roll stability control system, a yaw stability system. Also, a suspension may be controlled to maintain a more uniform axle/wheel loading, particularly in a heavy truck application. Another vehicle system may include the computation of the surface mu for various vehicle dynamics control purposes.

In roll stability controls, such normal loading detection can be used to conduct wheel lift detection and control gain scheduling.

The normal loading can be used to modify the driver's braking during high speed driving so as to generate least vehicle path deviation. In such cases where the vehicle is braked during high speed driving, ABS brake controls modify the request amount of the braking pressure from the driver, i.e., the driver request brake pressures are altered to the amounts in proportion to the normal loadings at the four wheels. In this way the vehicle would have less path deviation during driver braking at high speed driving.

Such a normal loading modified driver braking would also generate less aggressive pitch motion of the vehicle. Although the vehicle pitch angle due to the vehicle's deceleration is the same, such normal loading based driver braking will generate less pitch rate than non-modified driver braking. Hence less pitch disturbance to the passengers and the freight inside the vehicle can be achieved.

The yaw stability control can also benefit from including the usage of the normal loading. For example, both driver braking torques and driving torques (for 4×4 system case) can be distributed to each of the four wheels based on the amount of the vehicle normal loadings on top of the yaw stability request torques. In this way the unnecessary path deviation of the vehicle can be minimized.

The suspension control can be conducted based on the normal loading information.

The road surface friction level at each corner can be related to the normal loading, the wheel rotational acceleration, the driving torque and the braking torque at each corner. For the ith corner, we have $$\mu(i) = \min\left(1, \max\left(0, \frac{r(i)[\tau_d(i) - \tau_b(i)] - J_w(i)\dot{w}(i)}{N(i)r^2(i)}\right)\right) \quad (12)$$

where $\tau_d(i)$ is the driving torque calculated from the engine torque if the ith wheel is a driven wheel, $\tau_b(i)$ is the brake torque which is usually proportional to the applied brake pressure, $J_w(i)$ is the rotational inertia of moment of the ith wheel/tire assembly, w(i) is the ith wheel speed sensor signal.

Notice that the above computation reflects the true road surface at the ith road/tire contact patch if the longitudinal slip ratio $\lambda(i)$ of the ith wheel is below a threshold $\bar{\lambda}_i$ and the ith wheel sideslip angle $\beta(i)$ is below another threshold $\bar{\beta}_i$ $$\mu(i) = \begin{cases} \min\left(1, \max\left(0, \frac{r(i)[\tau_d(i) - \tau_b(i)] - J_w(i)\dot{w}(i)}{N(i)r^2(i)}\right)\right) & if \ |\lambda(i)| \leq \bar{\lambda}_i, |\beta(i)| \leq \bar{\beta}_i \\ \text{past value of } \mu(i) & \text{otherwise} \end{cases} \quad (13)$$

Notice that the existing method of computing road surface mu usually performed well when the vehicle was driven during aggressive maneuvers. The existing methods usually were less accurate during steady state driving conditions. However using (13), the road surface mu can be calculated even during steady state condition. The reason is that during steady state driving, the vehicle is kept moving in a constant speed with constant steering wheel input (could be zero) and the wheel sideslip angles and longitudinal slip ratios are all close to zero. This implies that the conditions for using (13) hold automatically. In this case the road surface mu can be calculated as in the following $$\mu(i) = \frac{\tau_d(i)}{N(i)r(i)} \quad (14)$$

Notice also that the steady state road surface mu can be specifically used in limiting vehicle speed during turning in a curve. The curved road surface usually has a safe vehicle speed limit which depends on the road surface mu. Since vehicles usually pass a turn in steady state condition. Hence, many existing road surface mu computations fail to detect the road surface mu. Using (13) or (14), the road surface mu can be detected even with steady state curving. If the vehicle is equipped with a GPS receiver together with a GPS map, then based on the detected average road surface mu computed from (13) (including steady state mu) and the curvature of the road, a speed limit $v_{curve}$ can be determined through the following function $$v_{curve} = f(\rho_{curve}, \mu_{ave}) \quad (15)$$

where $\rho_{curv}$ is the road curvature determined through GPS signal and the GPS map, $\mu_{ave}$ is the average road surface mu based on the calculated $\mu(i)$ for i=1, 2, 3, 4. The vehicle brake control system or adaptive cruise control is used to limit the vehicle velocity below the above computed $v_{curve}$.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling a vehicle comprising:
   determining a heave motion wheel loading;
   determining an attitude based wheel loading;
   determining a vertical motion induced wheel loading;
   determining a total wheel normal loading in response to the heave motion wheel loading, the attitude based wheel loading and the vertical motion induced wheel loading; and
   controlling a vehicle system in response to the total wheel normal loading.

2. A method of controlling a vehicle as recited in claim 1 wherein determining a heave motion wheel loading comprises determining the heave motion wheel loading in response to a vertical acceleration.

3. A method of controlling a vehicle as recited in claim 2 wherein determining the heave motion wheel loading in response to a vertical acceleration comprises determining the heave motion wheel loading in response to a moving-road-frame vertical acceleration.

4. A method of controlling a vehicle as recited in claim 2 wherein the vertical acceleration comprises a moving road frame vertical acceleration, said method further comprising determining a moving road frame vertical acceleration in response to a relative roll angle, a relative pitch angle and a body-frame vertical acceleration.

5. A method of controlling a vehicle as recited in claim 1 wherein determining a heave motion wheel loading comprises determining the heave motion wheel loading in response to a vertical acceleration and a longitudinal distance from a center of gravity to an axle of the vehicle.

6. A method of controlling a vehicle as recited in claim 1 wherein determining a heave motion wheel loading comprises determining the heave motion wheel loading in response to a vertical acceleration and a longitudinal distance from a center of gravity to a front axle and a rear axle of the vehicle.

7. A method of controlling a vehicle as recited in claim 1 wherein determining a heave motion wheel loading comprises determining a heave motion wheel loading in response to a vertical acceleration, a relative roll angle and a relative pitch angle.

8. A method of controlling a vehicle as recited in claim 1 wherein determining an attitude-based wheel loading comprises determining the attitude-based wheel loading in response to a longitudinal distance from a center of gravity to an axle of the vehicle, and a half track of the vehicle.

9. A method of controlling a vehicle as recited in claim 1 wherein determining an attitude-based wheel loading comprises determining the attitude-based wheel loading in response to a longitudinal distance from a center of gravity to a front axle or a rear axle of the vehicle, a rear half track width or a front half track width, a relative roll angle and a relative pitch angle.

10. A method of controlling a vehicle as recited in claim 1 wherein determining an attitude-based wheel loading comprises determining the attitude-based wheel loading in response to a longitudinal distance of a center of gravity from a front axle or a rear axle of the vehicle, a rear half track width or a front half track width, a relative roll angle, a relative pitch angle and a front or rear spring rate.

11. A method of controlling a vehicle as recited in claim 1 wherein determining a attitude-based wheel loading comprises determining an attitude-based wheel loading in response to a relative roll angle and a relative pitch angle.

12. A method of controlling a vehicle as recited in claim 1 wherein determining a vertical motion induced wheel loading comprises determining the vertical motion induced wheel loading in response to a vertical displacement of a wheel assembly.

13. A method of controlling a vehicle as recited in claim 1 wherein determining a vertical motion induced wheel loading comprises determining the vertical motion induced wheel loading in response to a vertical displacement and mass of a wheel assembly.

14. A method of controlling a vehicle as recited in claim 1 wherein determining a vertical motion induced wheel loading comprises determining the vertical motion induced wheel loading in response to a vertical acceleration of a wheel.

15. A method of controlling a vehicle as recited in claim 1 further comprising determining a vertical acceleration in response to a half track, a longitudinal distance from a center of gravity to an axle of a vehicle and a vertical distance from the center of gravity to an intersection of a vehicle body and a suspension.

16. A method of controlling a vehicle as recited in claim 15 wherein the half track comprises a front half track or a rear half track.

17. A method of controlling a vehicle as recited in claim 15 wherein a longitudinal distance from a center of gravity to an axle of a vehicle comprises a longitudinal distance from a center of gravity to a front axle or a rear axle.

18. A method of controlling a vehicle as recited in claim 1 wherein a vertical distance from the center of gravity to the intersection of the vehicle body and the suspension comprises a vertical distance from the center of gravity to an intersection of a vehicle body and the front or rear suspension.

19. A method of controlling a vehicle as recited in claim 1 wherein controlling a vehicle comprises controlling a vehicle safety system.

20. A method of controlling a vehicle as recited in claim 1 wherein controlling a vehicle comprises controlling a vehicle suspension.

21. A method of controlling a vehicle as recited in claim 1 wherein controlling a vehicle comprises controlling a dynamic control system.

22. A method of controlling a vehicle as recited in claim 1 wherein the dynamic control system comprises a roll stability control system.

23. The method as recited in claim 1 further comprising determining a road surface mu in response to the total wheel normal loading.

24. The method as recited in claim 23 wherein determining a road surface mu comprises determining the mu for steady state driving conditions.

25. The method as recited in claim 24 further comprising determining a maximum speed of the vehicle during steady state curving to avoid vehicle spinout in response to the mu.

26. A method of controlling a vehicle comprising:
for a right front wheel, a left front wheel, a right rear wheel and a left rear wheel performing the steps of determining a respective heave motion wheel loading;
for a right front wheel, a left front wheel, a right rear wheel and a left rear wheel, determining a respective attitude-based wheel loading;
for a right front wheel, a left front wheel, a right rear wheel and a left rear wheel, determining a respective vertical motion induced wheel loading;
determining a right front total wheel normal loading, a left front wheel total normal loading, a right rear wheel total normal loading and a left rear wheel total wheel normal loading in response to the respective heave motion wheel loading, the respective attitude based wheel loading and respective vertical motion induced wheel loading; and
controlling a vehicle system in response to the right front total wheel total normal loading, the left front wheel total normal loading, the right rear wheel total normal loading and the left rear wheel total wheel normal loading.

27. A method of controlling a vehicle as recited in claim 26 wherein controlling a vehicle comprises controlling a vehicle safety system.

28. A method of controlling a vehicle as recited in claim 26 wherein determining a respective heave motion wheel loading comprises determining the respective heave motion wheel loading in response to a vertical acceleration.

29. A method of controlling a vehicle as recited in claim 26 wherein determining the respective heave motion wheel loading in response to the vertical acceleration comprises determining the respective heave motion wheel loading in response to a moving-road-frame vertical acceleration.

30. A method of controlling a vehicle as recited in claim 26 further comprising determining a moving road frame vertical acceleration in response to a relative roll angle, a relative pitch angle and a body-frame vertical acceleration.

31. A method of controlling a vehicle as recited in claim 26 wherein determining a respective heave motion wheel loading comprises determining the respective heave motion wheel loading in response to a vertical acceleration and a longitudinal distance from a center of gravity to an axle of the vehicle.

32. A method of controlling a vehicle as recited in claim 26 wherein determining a respective heave motion wheel loading comprises determining the respective heave motion wheel loading in response to a vertical acceleration and a longitudinal distance from a center of gravity to a front axle and a rear axle of the vehicle.

33. A method of controlling a vehicle as recited in claim 26 wherein determining a respective heave motion wheel loading comprises determining a respective heave motion wheel loading in response to a vertical acceleration, a relative roll angle and a relative pitch angle.

34. A method of controlling a vehicle as recited in claim 26 wherein determining a respective attitude-based wheel loading comprises determining the respective attitude-based wheel loading in response to a longitudinal distance from a center of gravity to an axle of the vehicle and a half track of the vehicle.

35. A method of controlling a vehicle as recited in claim 26 wherein determining a respective attitude-based wheel loading comprises determining the respective attitude-based wheel loading in response to a longitudinal distance from a center of gravity to a front axle or a rear axle of the vehicle, a rear half track width or a front half track width, a relative roll angle and a relative pitch angle.

36. A method of controlling a vehicle as recited in claim 26 wherein determining a respective attitude-based wheel loading comprises determining the respective attitude-based wheel loading in response to a longitudinal distance of a center of gravity from a front axle or a rear axle of the vehicle, a rear half track width or a front half track width, a relative roll angle, a relative pitch angle and a front or rear spring rate.

37. A method of controlling a vehicle as recited in claim 26 wherein determining a respective attitude-based wheel loading comprises determining a respective attitude-based wheel loading in response to a relative roll angle and a relative pitch angle.

38. A method of controlling a vehicle as recited in claim 26 wherein determining a respective vertical motion induced wheel loading comprises determining the respective vertical motion induced wheel loading in response to a vertical displacement of a wheel assembly.

39. A method of controlling a vehicle as recited in claim 26 wherein determining a respective vertical motion induced wheel loading comprises determining the respective vertical motion induced wheel loading in response to a vertical displacement and mass of a wheel assembly.

40. A method of controlling a vehicle as recited in claim 26 wherein determining a respective vertical motion induced wheel loading comprises determining the respective vertical motion induced wheel loading in response to a vertical acceleration of a wheel.

41. A method of controlling a vehicle as recited in claim 26 further comprising determining a respective vertical acceleration in response to a half track, a longitudinal distance of a center of gravity from an axle of a vehicle and a vertical distance of the center of gravity from an intersection of a vehicle body and a suspension.

42. A method of controlling a vehicle as recited in claim 41 wherein the half track comprises a front half track or a rear half track.

43. A method of controlling a vehicle as recited in claim 41 wherein a longitudinal distance from a center of gravity to an axle of a vehicle comprises a longitudinal distance of a center of gravity from a front axle or a rear axle.

44. A method of controlling a vehicle as recited in claim 41 wherein a vertical distance from the center of gravity to the intersection of the vehicle body and the suspension comprises a vertical distance from the center of gravity from an intersection of the vehicle body and the front or rear suspension.

45. A method of controlling a vehicle as recited in claim 26 wherein controlling a vehicle comprises controlling a vehicle suspension.

46. A method of controlling a vehicle as recited in claim 26 wherein controlling a vehicle comprises controlling a dynamic control system.

47. A method of controlling a vehicle as recited in claim 26 wherein the dynamic control system comprises a roll stability control system.

* * * * *